Patented June 22, 1948

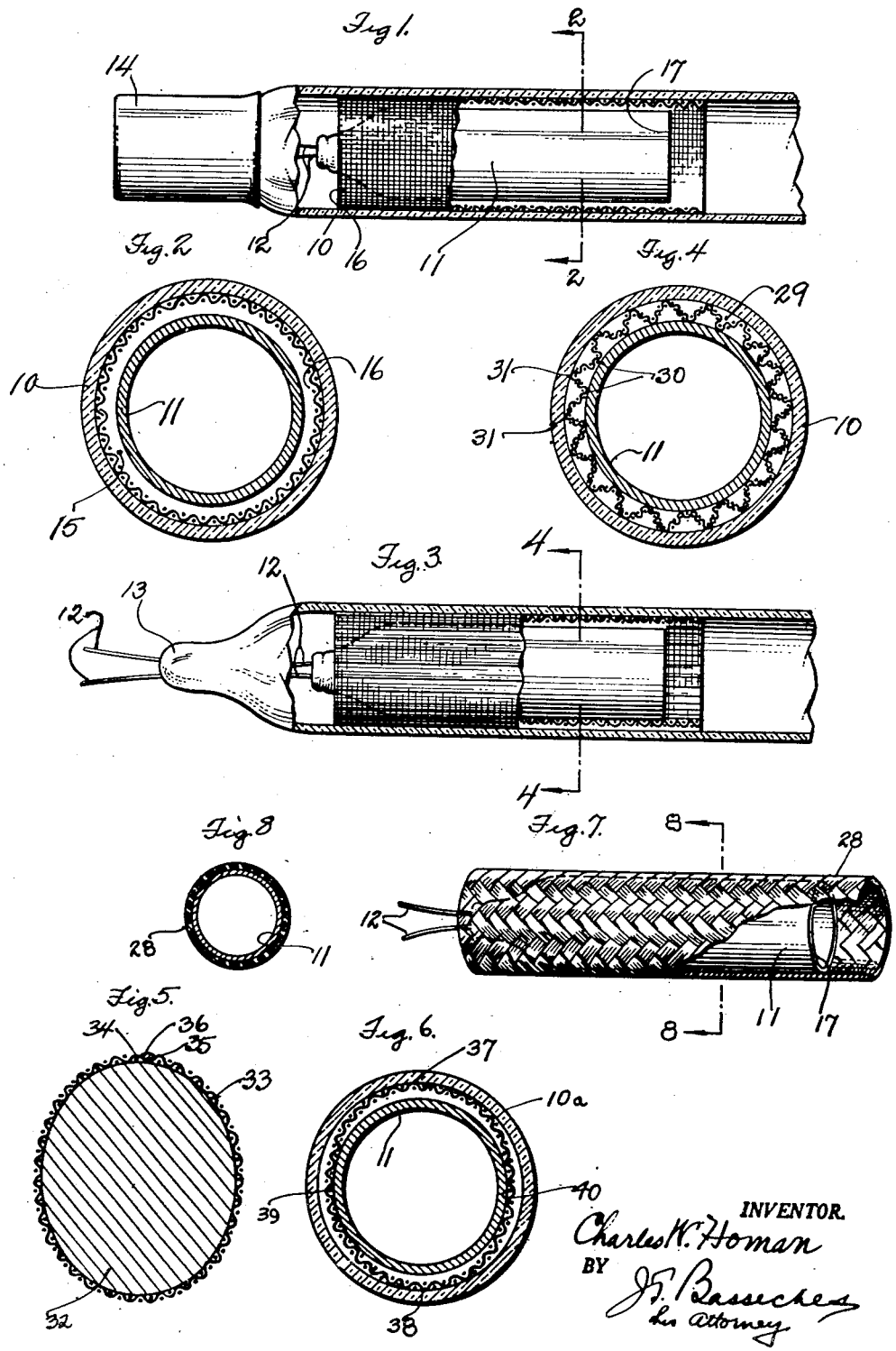

2,443,617

UNITED STATES PATENT OFFICE 2,443,617

INSULATOR MATERIAL FOR NEON SIGN ELECTRODES, METHOD OF MAKING THE SAME, AND RESULTANT ARTICLE

Charles W. Homan, Jackson Heights, N. Y., assignor to Samuel C. Miller, New York, N. Y.

Application December 30, 1942, Serial No. 470,584

7 Claims. (Cl. 176—126)

This invention relates to improvements in insulator material for neon signs or the neon type of luminous tube, the method of preparing the same and the resultant article, more particularly my invention relates to the provision of heat and electrical insulating material serving as a spacer between the electrode shell and the glass enveloping tube for the gaseous discharge tube familiarly known as Neon sign electric tubing.

In the assembling of gaseous discharge tubes of the character illustrated in the patent to Samuel C. Miller, 2,064,485, December 15, 1936, as well as in the patent to Ralph W. Lohman, 1,739,513, December 17, 1929, beneficial effects are secured in the electrode for the vacuum tube by the inclusion of insulating material acting as a spacer between the electrode shell and the glass envelope. The construction of the Miller patent in the employment of a spacer is particularly valuable inter alia during the processing of the vacuum tube. The inclusion of insulating material adjacent the mouth of the electrode has additional benefits dealing with the long life of this type of electrical appliance more particularly in overcoming sputtering defects and jacketing of the fluorescent coating material where the electrode forms part of a luminous tube employing fluorescent coating on the glass envelope.

In the electrode assemblies exemplified by the Miller and Lohman patents, insulator spacers are exemplified made of ceramic materials which because of the shaping and baking operations are expensive or difficult to handle, also because of the variables involved in the forming or drawing of the glass envelopes requires a rather large tolerance in size to accommodate the electrode and spacer in respect of the envelope to encase the same.

Flexible spacers in the form of glass beads or coiled sheet mica are known to me but neither of these materials lend themselves to any more economical production methods than cast or molded ceramic products. Mica, particularly, is frequently an inaccessible material and requires special skill in working. Thus while glass and mica suggest themselves as dielectrics, they are in disfavor as compared with the shaped ceramic spacers due to the greater problem and labor expense involved in handling, not to speak of the limitation in source of supply for such materials as mica.

My invention is therefore predicated upon my discovery of the unusually high dielectric strength of glass fibre especially when treated in accordance with my method, making this material available as a spacer, i. e., as a heat and electrical insulation for the shell electrode in the fluorescent or gaseous discharge tubes which provides the facility of handling without the hazard or other drawbacks of mica yet equalling, if not surpassing it in certain other aspects such as handling, production, shaping, source of supply.

Accordingly it is an object of my invention to make fibre glass, particularly pyrex fibre glass in woven condition, available as an insulator, particularly as a spacer for the electrode in gaseous discharge tubes.

My invention is predicated upon the discovery of a method for treating woven fibre glass cloth, more particularly pyrex fibre glass cloth which will impart to this material toughness, simplifying the handling of the material in the production of articles such as neon tubes and to purify this material while retaining adequate heat and electrical insulating properties necessary in the operation of gaseous discharge tubing such as the fluorescent neon discharge tubing.

Accordingly, my invention further has as its object the provision of a method for treating pyrex fibre glass cloth or light woven glass fibre or fabric to impart new highly desirable physical properties to the same and in the formation of spacers useful in vacuum tubes of the character mentioned.

Still further objects of my invention reside in the provision of new and novel electrode assemblies.

Still further objects of my invention reside in the provision of novel, simple and inexpensive electrode construction and spacers for the electrode shell thereof which when placed in relation to the enveloping glass tubing which will minimize breakage, assure long life in operation, and minimize the cost involved in the assembly and installation of the electrode structure.

To attain these objects and such further objects as may appear herein or be hereinafter pointed out, I make reference to the accompanying drawings forming a part hereof in which:

Figure 1 is a fragmentary longitudinal sectional view, and a fragment of a vacuum tubing illustrating my invention;

Figure 2 is a section taken on the line 2—2 Figure 1;

Figure 3 is a fragmentary longitudinal sectional view of another embodiment of my invention;

Figure 4 is a section taken around the line 4—4 of Figure 3;

Figure 5 is a sectional view of a mandrel showing one manner of producing a spacer in accordance with another embodiment of my invention.

Figure 6 is a sectional view of an electrode employing a spacer in accordance with the embodiment illustrated in Figure 5.

Figure 7 is a fragmentary longitudinal sectional view of a further embodiment of my invention.

Figure 8 is a section taken on the line 8—8 of Figure 7.

Making reference to the drawings, I will illustrate my invention for the production of insulator material for neon sign electrodes wherein there is shown the glass envelope 10 within which there is located an electrode shell 11, held concentrically in relation to the inner walls of the tube 10 by the lead wires 12, fused into the pedestal 13 and terminating exteriorly of the crimped portion into wires or pigtails to which the contact shell 14 is soldered on its interior surface. This assembly is now well known in the art.

In the space 15 between the exterior of the shell electrode 11 and the envelope 10 is interposed a layer of electrical insulating material 16, in the form of a cylinder or convolute extending beyond the mouth 17 of the shell electrode, and rearwardly adjacent to the crimped portion of the electrode shell, where this is employed. The purpose of this insulating material is to some extent in accordance with that referred to in the Lohman and Miller patents above mentioned, as well as to act in the nature of a spacer to prevent cracking of the glass, should the lead wires 12 sag during the processing of the tube in bombarding the electrode assembly to purify the interior of the neon tube.

Apart from the employment of the molded or cast ceramic collars referred to in the Lohman and Miller patents, sheet mica has been employed. This latter material can only be bent along curves of small radii by splitting the mica to extremely thin layers. It is only by thus splitting the mica, that pure sheets of this material can be formed into a cylindrical shape to fit within the space 15, sometimes reaching diameters of ⅜", with the shell materially smaller.

While convolutes or cylinders of mica have ben employed, the limitations of this material are quite apparent and it is my object to provide a new insulating material which has many of the advantages of mica but lacking in its disadvantages. I have found that fibrous glass, particularly fibrous glass made from borosilicate glass, supplied on the market by the Corning Glass Co. as Pyrex Fiberglas, or by the Owens-Corning Fiberglas Corporation, lends itself to the formation into convolutes, sleeves, cylinders when formed into cloth, braid, felt or paper-like sheets which may be wrapped about the electrode shell and disposed in the space 15 or formed into cylinders by weaving into the form of a braid. This material as provided in the form of sheets preferably woven fabric from yarns composed of bundles of fine glass fibers is made flaccid by lubricating the fibers, protecting the fibers with oils, resins, adhesives such as pyroxylin, Bakelite resins and like organic binder materials, with or without plasticizers. These organic materials are undesirable impurities in the fibrous glass sheeted product. Efforts to extract these organic materials, leave the fabric so soft and flaccid as to require that the electrode be completely wrapped to supply the form sustaining characteristics to be retained by packing within the space 15.

As desirable as this procedure may be, to simplify the process of making this fibrous glass available, I have purified the same by burning off the organic lubricant or binding material. Here again, decomposition of the organic material at minimum temperatures for this purpose leaves the fabric flaccid and in the use of this form of material the wrapping and packing into the intermediate space 15 for locating it is employed. With continued heating beyond a range oxidizing the organic matter, the product progressively is stiffened and then becomes embrittled.

I have discovered that by heating Pyrex Fiberglas in sheet form preferably woven into tape or braid form to burn off the carbonaceous residue of the binder under oxidizing conditions, below 700° C. and preferably at about 693° C., stiffness characteristic of a hair cloth lining is imparted to the woven fibre glass simulating, to a degree, thin sheets of mica used as spacers about electrode shells for luminous tubes.

Preferred procedure in accordance with my invention is as follows:

*Example A*.—First heat the fiber glass fabric until it reaches progressively a temperature of about 400 to 450° C. to burn off the lubricant, or binders if present, and to carbonize the same. The residue is then heated under oxidizing conditions to remove the carbonaceous material. A temperature below 700° C. is employed to eliminate the carbonaceous residue. Within a range of 704 to 710° C. and over, physical changes are likely to occur, resulting in embrittlement of the fibers. Baking at 693° C. is therefore preferred. Purification of the fiber glass fabric by heat to eliminate the carbonaceous residue, occurring at the flash point (400 to 450° C.) stiffens the fabric. Sufficient springiness is evidenced so that the fabric, when bent, tends to spring out to a flattened form like paper and no longer has the limpness of the lubricated or impregnated fabric, yet avoiding the brittleness of fused fabric.

I am of the view, but I do not wish to be confined to this explanation, that the stiffness imparted to the cloth or woven sheet found so desirable in accordance with the preferred embodiment of my invention, is probably due to the fact that under the temperature conditions preferred by me an alteration of the glass in the fibrils occurs analogous to drawing off the temper of steel. This temperature treatment modifies the effect of the annealing treatment to which the fiber glass was subjected originally, necessary to flexibilize it and facilitate the twisting or fabrication of the yarn, thereby to stiffen the composite.

As a possible alternative explanation, some degree of sintering of the yarns at the points of contact may be resorted to by the foregoing treatment, thereby to stiffen the fabric by limiting the slippage of the threads over each other.

It will be understood that after reaching the preferred range, preferably below 700° C. to oxidize the carbonaceous residue, the product is preferably annealed in a manner well known to the skilled glass worker, to release or prevent undue stresses or strains caused by the heating and cooling of the glass.

*Example B*.—While I have described and prefer the purification of fiber glass fabric or sheeting by the application of heat, I may accomplish the same chemically. For this purpose, a solvent for the lubricant or binder is ascertained and then is used to extract the same from the fabric after which the solvent is evaporated. In one form heating the fiber with alkali solutions and then washing the same has been found to provide a suitable procedure, where saponifiable resins, waxes or oils are employed in the same as the fiber lubricant or binder. This procedure supplies a flaccid fabric requiring that the fabric be sustained in position by wrapping and packing in the space 15.

*Example C.*—Where the lubricants or binders are more inert, combinations of the chemical and heat treatment may be resorted to as follows:

Heat is applied to the fiber glass fabric from 200 to 400° C. to depolymerize and carbonize the fiber lubricant and binder. In the case where Bakelite phenolic resin is employed, with this range, carbonization of this lubricant or binder is effected. Thereupon the carbonaceous residue is treated with a chemical agent at room temperature, such as by employing one of the following agents: nitric acid, potassium chloride, potassium dichromate, admixed with sulfuric acid. After washing out the excess oxidizing agent and drying the material, it is ready for use, preferably, however, after again heating within a range gradually reaching 700° C. Best results have been obtained by baking at 693° C.

The purified fiber glass fabric made by methods exemplified under "A" and "C" may be bent along curves of small radii and to the extent that folding may be secured along curves not possible with the thinnest sheets of mica, the fiber glass fabric is accordingly superior to mica. The purified fabric made under example "B" is limp and flaccid.

When used as a heat and electrical insulator in the space between the envelope and the electrode shell, processing by bombardment has been found not to release any impurities and the product has the adequate dielectric strength and heat insulation resistance experienced with mica and the finest grades of ceramic spacers. High vacuums may be employed without fear of releasing any impurities.

The interwoven relationship of the fibers provides a cushion protecting the glass against any shock in vibration of the electrode shell.

While the fiber glass, purified in accordance with my method, is soft enough to lend itself readily to wrapping or folding about the electrode shell, under the preferred procedure of stiffening the fabric, sufficient resilience is supplied so that its tendency to unroll or flatten serves frictionally to engage the glass tubing as illustrated in Figure 2, so that when the convolute is released, it will unwind itself and frictionally engage the glass tubing 10, preventing displacement of this material by engagement of the glass walls of the enveloping tube.

Glass wool fabric spacers in accordance with this invention provide a continuous insulating sheeting between the electrode shell and the glass tubing of the character not secured by packing the space with other materials such as asbestos, ceramic materials, or glass beads.

While I have described the formation of insulating spaced material in the form of a convolute, I have found it convenient to provide a cylindrical section of material by weaving or braiding the same.

In Figures 7 and 8, the insulator sleeve 28 is that secured by weaving the fabric glass threads into a tube by a braiding machine. This tube may be mounted upon the electrode shell 11 to extend beyond the mouth 17 at one end, and approximately to the crimped base of the shell at the opposite end. In this assembled condition, with the lead-in wires or pigtails 12 extending from the same, the assembly is positioned within the glass tube envelope 10 and the seal 13 then formed about the lead-in wires or pigtails 12 by the usual glass blowing operation.

While the cylindrical member 28 may grip and frictionally engage the shell electrode 11, the diameter of this material may be sufficiently large frictionally to engage the interior wall of the glass tube 10, as more closely approximating the condition of the insulator sheathing shown in Figures 1 and 2.

As a further variation, the braided material may be crimped to provide longitudinally arranged crimpings or flutes 29, shown more clearly in Figures 3 and 4. Oppositely disposed ridges 30 and 31 will alternately engage the shell electrode 11 and the envelope 10 to concentrically space the shell electrode within the glass tubing and support the same against vibration and shock, while retaining a predetermined concentric spacing.

Where braiding may not be found desirable because of expense or impracticability in handling, I may make the cylindrical insulator spacers of fiber glass fabric by forming the same from sheets as follows:

I provide a mandrel 32, preferably elliptical in cross-section and wrap the woven fiber glass fabric or sheet 33 about the same to bring the terminal edges 34 and 35 in abutting relationship. These edges are thereupon joined by fusing along the line 36.

The cylindrical member thus formed is then removed from the mandrel 32. By reason of the stiffened condition of the fabric, the elliptical contour is retained after removal from the mandrel. The major axis of the ellipse is calculated to be greater than the inside diameter of a tube, such as 10a.

Due to the resiliency of the fabric, the cylindrical member thus formed may be inserted within the tube 10a by slight compression along the longer axis. Upon release subject to insertion within the tube, expansion of the cylindrical member along the major axis causes the spacer to engage the tube 10a, frictionally holding it in any predetermined position, as more clearly shown in Figure 6, wherein the frictional contact is made adjacent the points 37 and 38.

In this condition the shell electrode 11 is concentrically positioned in the tube 10a and lies within the space 17 in the form of an elliptically shaped cylindrical spacer. The minor axis of the ellipse may, under these conditions, be selected to be of such size as to contact and concentrically suspend the electrode shell 11, as shown at the points 39 and 40. The softened condition of the woven fiber glass spacer permits of the formation of a wide variety of contours, while serving to provide sufficient frictional engagement with the inner walls of the glass tubing to hold the cylindrical spacer in position without the necessity for packing or the employment of fastening connections between the glass envelope or the electrode shell.

The data herein given under Examples A and C is that secured with a thermocouple pyrometer known as the Wheelco Capacitrol, bulletin D2, made by the Wheelco Instruments Company of Chicago. The temperatures given, therefore, are approximate and characteristic of the accuracy of this temperature control instrument and variations may be required with other temperature measuring devices.

In general, variations in the temperature operating conditions may be found necessary as changes in glass compositions from which the fiber glass is made are experienced. The upper range of temperature to be observed and to be avoided is that which will cause embrittlement of the fibrils of glass or bundles of these fibrils in the form of yarn.

It will be observed that I have provided a method for forming a new insulating material having highly desirable properties in respect of such desideratum as dielectric properties, heat insulating properties and cushioning properties, which may be secured with uniformity and precision and by economical methods of production.

Having illustrated my invention, I claim:

1. The method for forming a dielectric insulator spacer sheeting material for the electrodes of gaseous discharge tubes to be positioned between the electrode and glass envelope which includes, as the steps thereof, heating a woven sheeted material made of yarns comprising fibrous boro-silicate glass treated with a lubricant for the fibrils of which the yarn is formed to make the production of the yarn and sheeted material commercially feasible, carbonizing the lubricant, oxidizing the carbonaceous residue to remove the same while heating within a temperature range preventing the fusion of the fibrils.

2. The method for forming an insulator spacer sheeting for electrodes to provide a material of stiffness characteristic of hair cloth, tending to spring out and become frictionally supported in the envelope for the electrode and being characterized by its bendability along curves of small radii, to fit within the glass envelope, comprising heating sheeted material of inter-laced fibrils of fibrous boro-silicate glass treated with a lubrican to flexibilize the sheet and make its production commercially feasible, heating being continued to burn out the lubricant and leave a carbonaceous residue, and then continuing the heating under oxidizing conditions to purify the sheet within a temperature range avoiding embrittlement of the sheet.

3. The method for forming a dielectric insulator spacer sheeting material for the electrodes of gaseous discharge tubes in accordance with claim 1 in which the heat treatment is below 700° C. but within a range to remove the carbonaceous residue.

4. The method for forming a dielectric insulator spacer sheeting material for the electrodes of gaseous discharge tubes in accordance with claim 1 wherein said heat to remove the carbonaceous residue is about 693° C.

5. Insulator material forming a spacer sheeting for electrodes of luminous tubes comprising fibrous boro-silicate glass interlaced into sheeted form substantially free from lubricant, characterized by its freedom from embrittlement, permitting bending along curves of small radii for insertion in the space between the glass envelope and the electrode, and a springiness and stiffness to retain its own weight when so positioned.

6. An insulator material in accordance with claim 5 comprising a cylindrical body.

7. An insulator material in accordance with claim 5 comprising a cylindrical body of elliptical cross-section.

CHARLES W. HOMAN.

REFERENCES CITED

The following references are of record in the file of this patent:

UNITED STATES PATENTS

| Number | Name | Date |
|---|---|---|
| 424,575 | Reed | Apr. 1, 1890 |
| 702,725 | Hammesfahr | June 17, 1902 |
| 1,656,828 | Powell | Jan. 17, 1928 |
| 2,016,401 | Thomas | Oct. 8, 1935 |
| 2,073,715 | Stone et al. | Mar. 16, 1937 |
| 2,170,066 | Ruben | Aug. 22, 1939 |
| 2,181,924 | Spanner | Dec. 5, 1939 |
| 2,202,820 | Baird et al. | June 4, 1940 |
| 2,204,288 | Wilkoff | June 11, 1940 |
| 2,224,484 | Morrow | Dec. 10, 1940 |
| 2,263,217 | Lillie et al. | Nov. 18, 1941 |
| 2,271,829 | Powers | Feb. 3, 1942 |

FOREIGN PATENTS

| Number | Country | Date |
|---|---|---|
| 475,464 | Great Britain | Nov. 19, 1937 |